United States Patent [19]
Holt et al.

[11] Patent Number: 6,142,238
[45] Date of Patent: Nov. 7, 2000

[54] FIRE TRACTOR HITCH AND FIRE FIGHTING METHOD

[76] Inventors: Anthony James Holt, P.O. Box 504; Andrew Charles Holt, P.O. Box 1685, both of Silverdale, Wash. 98383

[21] Appl. No.: 08/980,217

[22] Filed: Nov. 28, 1997

[51] Int. Cl.[7] .............................. A62C 2/00; A62C 27/00
[52] U.S. Cl. .............................. 169/47; 169/24; 169/52; 169/45; 239/172
[58] Field of Search .................... 169/24, 46, 47, 169/52, 45, 70; 239/1, 164, 166, 149, 172; 280/433, 839; 305/157, 165, 185; 180/9.1, 9.4

[56] References Cited

U.S. PATENT DOCUMENTS

| | | | |
|---|---|---|---|
| 1,421,496 | 7/1922 | Klewanech | 169/24 |
| 3,169,581 | 2/1965 | Cummins | 169/24 |
| 3,220,482 | 11/1965 | Eveleth | 169/52 X |
| 3,815,683 | 6/1974 | Collin, Jr. et al. | |
| 3,831,849 | 8/1974 | Studinger | 239/172 X |
| 4,101,485 | 7/1978 | Brooks et al. | 252/2 X |
| 4,149,732 | 4/1979 | Watkins, Jr. | 280/433 X |
| 4,170,264 | 10/1979 | Gibson | 169/24 |
| 4,199,168 | 4/1980 | Bush et al. | |
| 4,875,526 | 10/1989 | Latino et al. | 169/24 |
| 4,887,831 | 12/1989 | Edwards | |
| 4,946,184 | 8/1990 | Larocco | 280/433 |
| 4,991,863 | 2/1991 | Hosmer | 280/433 X |
| 5,090,720 | 2/1992 | Heider et al. | |
| 5,112,533 | 5/1992 | Pope et al. | 252/2 X |
| 5,297,911 | 3/1994 | Powell | |
| 5,628,459 | 5/1997 | Bennett, Jr. | 169/52 X |
| 5,641,024 | 6/1997 | Alvarez | 169/52 |
| 5,730,454 | 3/1998 | Dudzik et al. | 280/433 X |

OTHER PUBLICATIONS

Advertisement Jan. 1997 Fire Engineering Magazine p. 77.
Catalog p. 39 May 1993 Wajax–Pacific Fire Equipment.

*Primary Examiner*—Patrick F. Brinson
*Assistant Examiner*—Steven J. Ganey

[57] ABSTRACT

A method for fighting wildland and forest fire and a hitch assembly is described that allows a tank of fluid to be towed by a fire tractor to a fire location especially for the purpose of spraying and creating a foam fire break line. The hitch assembly attaches to a fire tractor and uses fifth wheel plate and kingpin coupling to releasably lockingly connect a continuous track vehicle to a tank in the configuration of an over-the-road semi trailer or to the drawbar eye of a tank in the configuration of an over-the-road A-train trailer.

13 Claims, 8 Drawing Sheets

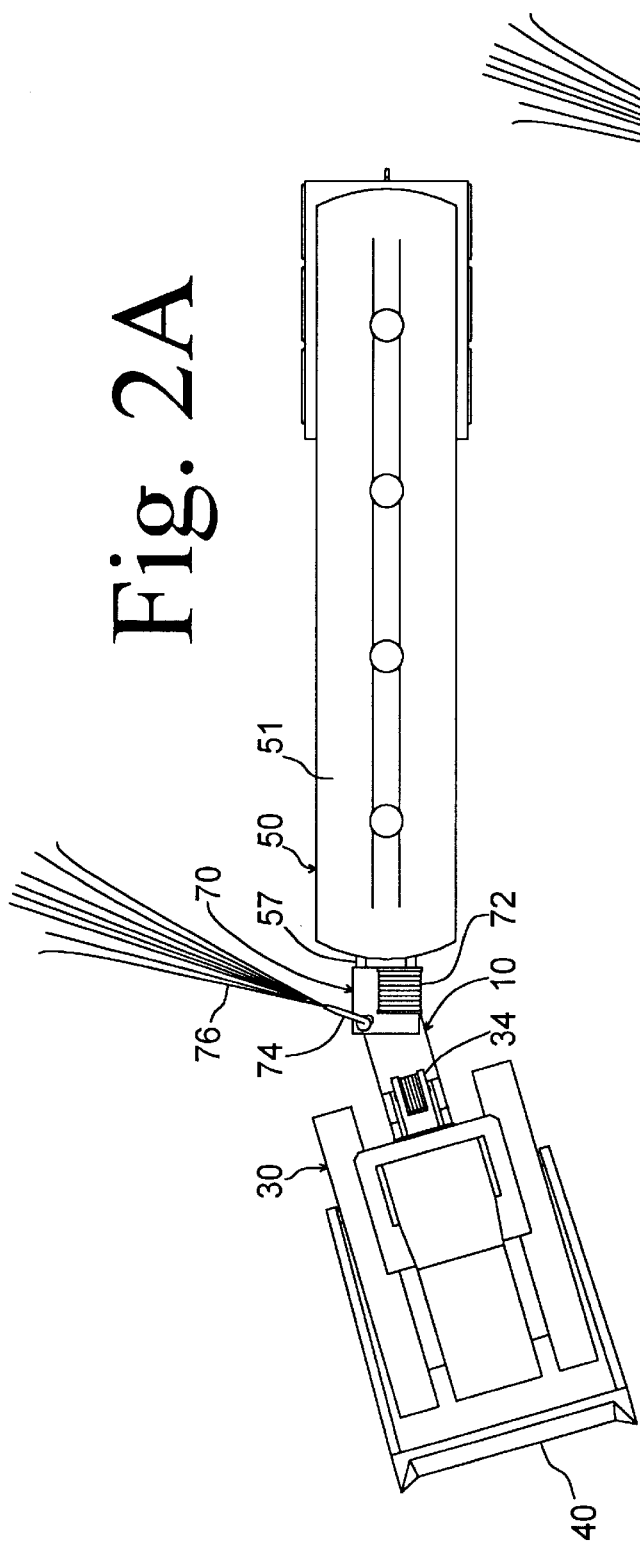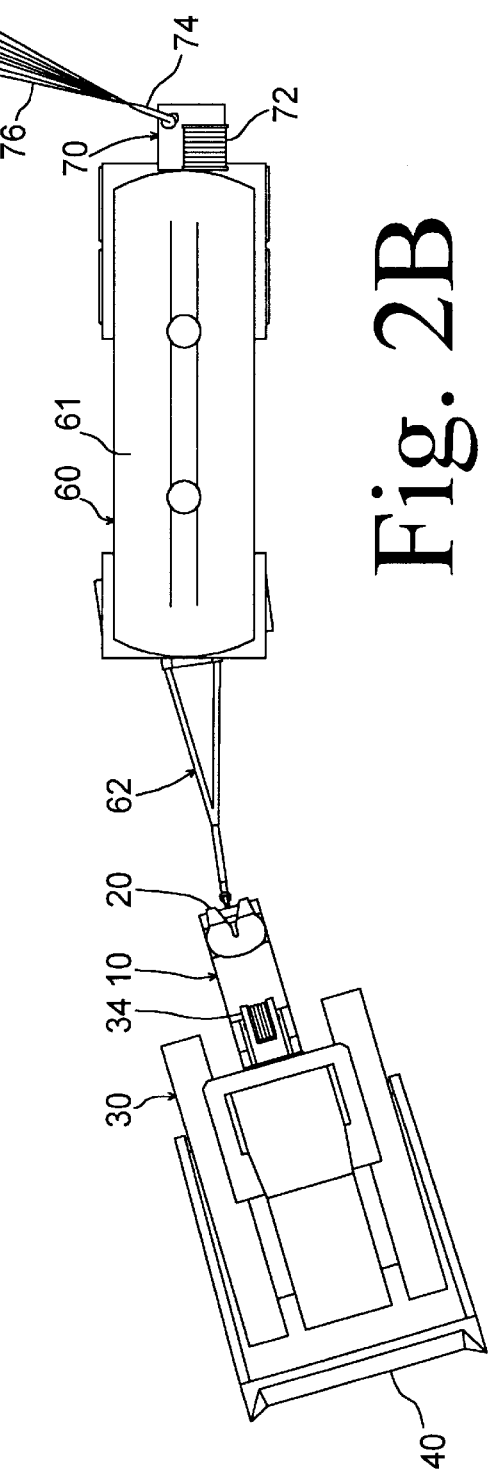

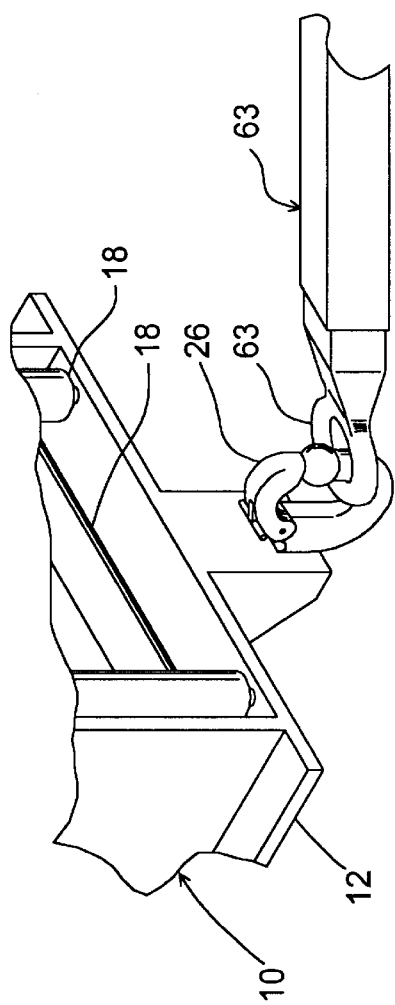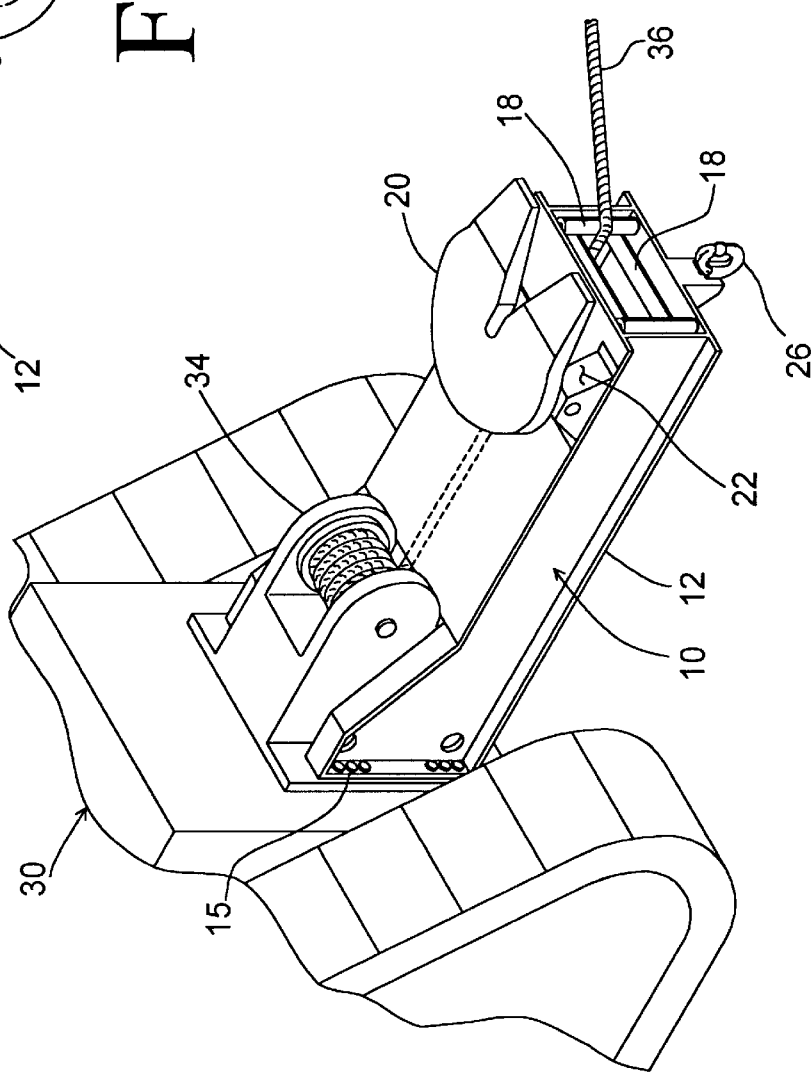

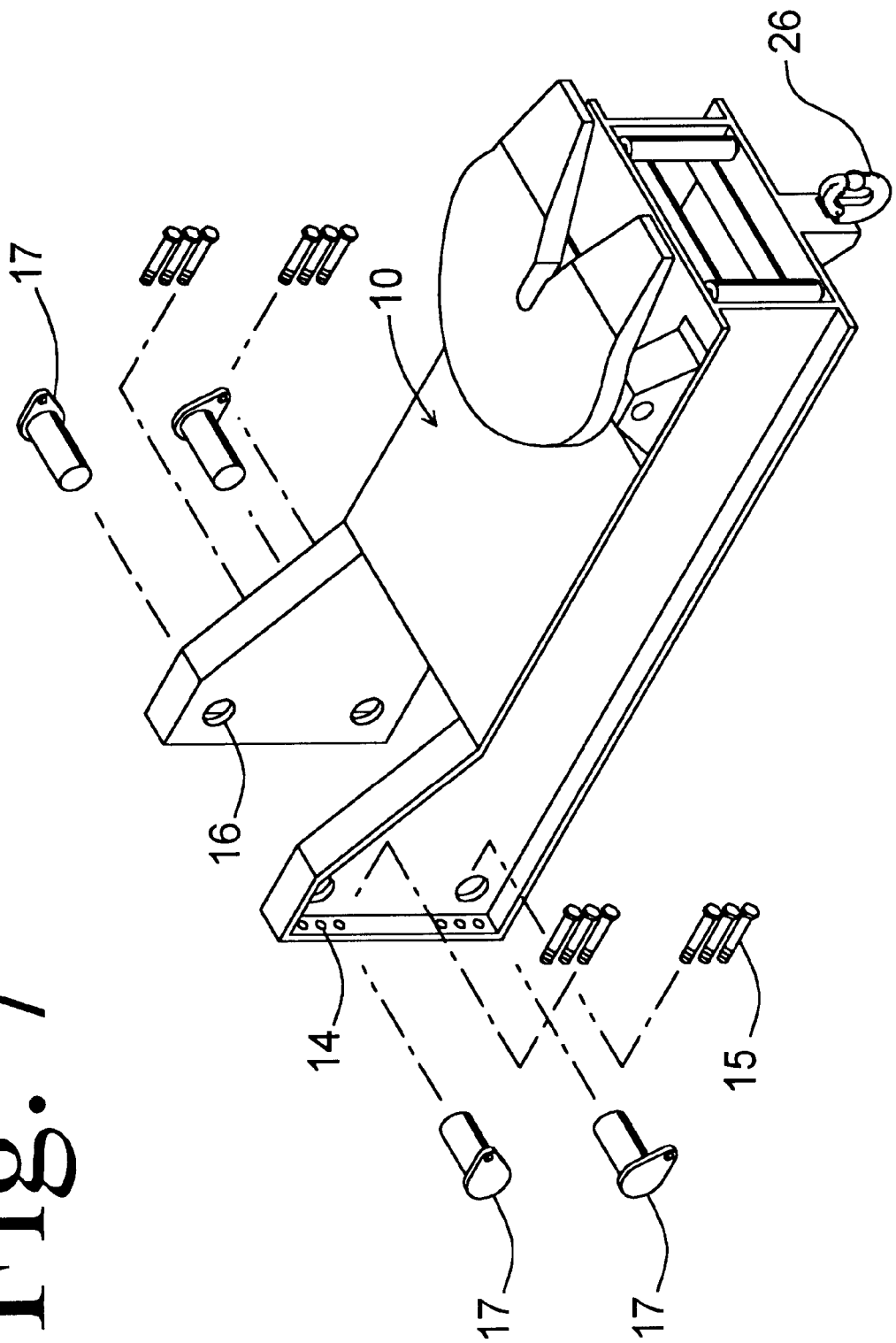

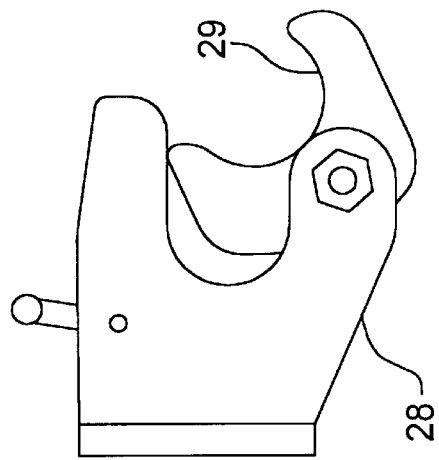
Fig. 9B    Fig. 9A
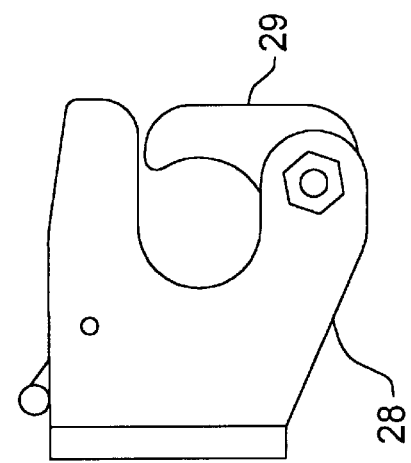
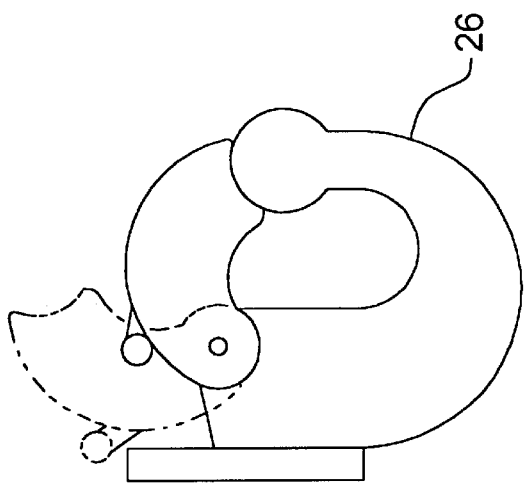
Fig. 8

FIRE TRACTOR HITCH AND FIRE FIGHTING METHOD

BACKGROUND OF INVENTION

1. Field of the Invention

The present invention relates to the coupling for a tractor and a trailer especially as used as a fire fighting method in the wildland and forest fire fighting industry.

2. Description of Prior Art

Ecologically sensitive wild land fire fighting has been an unresolved issue for some time now. This was particularly evident during the great Yellowstone wildfire in 1993. In wildland fire fighting there are primarily three distinct fire fighting methods employed on the ground.

The first method is the use of the continuous track vehicle, most frequently in the bulldozer configuration, in which fire break lines are scarred into the earth displacing dirt, trees, and vegetation. This fuel mass is removed from the fire path deterring further travel of fire. Although highly effective as a fire break method the dozing of the earth is believed by many to be a major source of problems after the fire. Long term effects include erosion, eradication of subterranean plant life, disturbing delicate ecosystems, and the inadvertent creation of undesirable roads.

In environmentally sensitive areas human handwork is required. In this second method wild land fire fighters and smoke-jumpers battle fires in these areas at great personal risk. They use hand hoes and shovels, along with chain saws and hotpacks to start back burn fires. The result is the same, to remove or consume the fuel mass in the path of oncoming fire. Death of firefighters is common in this method.

The third method is the use of small tender trucks or trailers towed behind trucks with limited and meager water capacity that are able to access small spots fires with an onboard hand water line. Prior art reference Wajax-Pacific Fire Equipment, May 1993 catalog p. 39, shows such a small portable trailer usable for spot fires.

A primary object of the invention is a novel fire fighting method that allows a fire tractor to tow an over-the-road tank trailer and deliver fire fighting foam to be sprayed in quantities adequate to provide a foam fire line precluding destructive method of dozing or the slow and dangerous work of a hand crew.

A further object of the present invention is to make the tank water also available off road to smaller tender tricks to replenish their supplies and for conventional water fire fighting means.

A further object of the present invention is the provision of a hitch assembly to allow releasable and locking fifth wheel plate and kingpin coupling or connecting of the fire tractor to a tank for carrying water or other fluid type in the configuration of an over-the-road semi trailer.

A further object of the present invention is the provision of a hitch assembly to allow a secondary hitch means to allow coupling to the drawbar eye on an over-the-road configuration A-train trailer that has forward and rearward axles or a plurality of axles at the forward or rearward end.

A further object of the present invention is a means to facilitate a plurality of tanks, in the configuration of over-the-road trailers, to be towed simultaneously for even greater fire fighting capacity.

Off road tractors have the power to move large and heavy loads, however they are not equipped to pull a conventional over-the-road semi trailer. Wheeled tractors are common especially to the agricultural industry and inexpensive. Prior art reference U.S. Pat. No. 5,090,720 adapting them for hauling over-the-road trailers using fifth wheel plate and kingpin coupling requires a type of wheeled dolly that will carry all or most of the vertical kingpin load. A great disadvantage is encountered in this dolly method because a forward articulation point is provided ahead of the rearward articulation point making the act of backing up the tractor, dolly, and trailer difficult and in some cases impossible. This is aggravated by the short radius distance between the hitch pin and the dolly fifth wheel plate.

Prior art reference U.S. Pat. No. 4,887,831 of Edwards is a further attempt to use the dolly method to employ a coupling method in the over-the-road kingpin configuration. Edwards in an attempt to provide a stable towing system for agricultural mobile equipment invented a unique dolly after he failed in his attempt to modify a conventional field vehicle to include a releasable fifth wheel.

The successful application of the present invention and the failure of Edwards should be apparent to one skilled in the art, as Edwards attempted to use a releasable fifth wheel to drag mobile equipment. To maximize field usage, agricultural equipment turns sharply at the end corners of a field. This essentially puts a jack knife condition between the tractor and the mobile equipment and shock loading into the fifth wheel plate, attaching means, and locking jaws. Towing equipment that is not equipped with spring of other type of suspension is jerky in a field application and causes undesirable loading of the fifth wheel plate. The fifth wheel plate is designed to accept a heavy vertical and horizontal loads, essentially static in nature. Edwards' attempt misused a highway type releasable fifth wheel causing it to fail to function satisfactorily under his three enumerated criteria. The successful application of the present invention described further in the preferred embodiment is shown to be unobvious in light of Edwards' attempt.

Prior art reference U.S. Pat. No. 5,297,911 of Powel is a lifting and tilting vehicle and fifth wheel plate that is necessarily employed from a fork lift mast. A vehicle of the claimed description is neither known nor desirable to the fire fighting industry with its complicated two end attachment arms and limited rotating elongate member lifting system. Continuous track vehicles available for use in fighting wildland fires come from two arenas, fire company owned machines and seasonal contracts with local logging and excavation companies who typically deploy their equipment to the fire location via over-the-road truck and lowboy semi trailer. Therefore one could reasonably expect bulldozers, excavators, and log skidders to be available and not a massive continuous track forklift.

Fifth wheel plate and kingpin type hitch coupling are within the scope of the present invention and prior art descriptions. Prior art reference U.S. Pat. No. 4,199,168 of Bush and Martin is an example of such a connecting hitch plate. A fifth wheel plate and specific attaching means which the letters of patent of Bush and Martin describe are cited here and further referred to in the preferred embodiment of the present invention. The particular attaching means and suspension system enumerated by Bush and Martin need not be employed to be within the scope of the present invention.

SUMMARY OF THE INVENTION

The fire tractor hitch and fire fighting method makes available a new technique for fighting wild land fires. Water is brought near the fire by the rapid deployment of an over-the-road semi-trailer water tank or A-train water tank.

The hitch assembly is removably connected to a fire tractor. The tank trailer or trailers are towed by the fire tractor off road toward the fire or desired fire break line location.

Foam is delivered from the tractor or the trailer to create a foam fire line or attack the fire directly. Fire fighting foam concentrate is applied with water as the delivery agent. Foam is becoming common and accepted in many fire fighting applications as an effective fire suppressant and retardant. Most foam is biodegradable and in this method replaces the hand work of a fire crew, greatly reducing the risk of human death.

The tank water is also available off road to smaller tender trucks to replenish their supplies or for conventional water fire fighting means.

Accordingly, several objects and advantages of the present invention are: a) the application to wildland fire fighting of a method to create a foam fire line that coats rather than removes the fuel mass of live and dead trees and vegetation with a fire retardant and suppressant foam; b) a further object of the method wherein a minimal ground impact is incurred from the traction vehicle causing less scarring of the earth and erosion than a hand crew or a dozer blade imparts; c) a further advantage of the method is that the agile combination of fire tractor and tank trailer can maneuver around mature trees and other obstacles that need not be removed in creation of a foam fire break line; d) a further object of the method wherein dangerous back burns, which at Yellowstone were blown by wind into major fires themselves, are obsolete saving lives of people and animals directly; e) a further object of the method wherein a tank trailer can service a fire line as a greater defensive ground strike in the case of immediate fire present or as a fast application offensive technique; f) a further safety advantage is the reduction of man power in hazardous areas by elimination of hand crew and smoke jumpers and the provision of a safe fire proof tractor cab for the operator or operators in the event that the fire tractor and trailer are overtaken by fire. Also other objects and advantages related to the hitch mechanism are: g) the ability to haul large capacity trailers with large continuous track vehicles capable of carrying the necessary rearward cantilevered load; h) a further advantage of this combination continuous track vehicle and over-the-road semi tank trailer is the proper loading of the fifth wheel plate and support assembly as embodied in the use of a trailer with a suspension system, to use a highway and off road type fifth wheel plate hitch assembly in the manner for which it is designed; i) a further advantage is the single articulation point at the fifth wheel allowing the assembly to back up giving great maneuverability; j) a further object is the ability to deploy an A-train trailer in a train with the fire tractor and semi tank trailer; k) a further object is the ability to deploy an A-train tank as a solitary unit for towing behind the fire tractor; l) a further advantage of the fifth wheel coupling and towing method is the ability to rapidly deploy the tank trailer or trailers over asphalt and dirt roads to strategic locations near the desired fire line location. Further objects and advantages of the present invention will become apparent from a consideration of the drawings and ensuing description.

DRAWING FIGURES

In the drawings, closely related figures have the same number but different alphabetic suffixes.

FIG. 2A is a plan view of a continuous track vehicle, hitch assembly, and semi tank trailer of the present invention shown discharging fluid.

FIG. 2B is a modified form of FIG. 2A wherein the tank trailer shown is in the A-train trailer configuration.

FIG. 3 is a perspective view of the hitch assembly attached to the rear of a continuous track vehicle of the present invention and shows a winch cable pulled taut.

FIG. 4 is a perspective view of the pintle hitch and drawbar eye.

FIG. 7 is a perspective view of the hitch assembly of the present invention that shows an exploded view of the optional lock pins as they relate to the mounting holes of the hitch assembly.

FIG. 8 is an elevation view of the pintle hitch indicating an alternate position.

FIG. 9A is an elevation view of the pivoting towing-horn hitch and FIG. 9B is an elevation view of the same pivoting towing-horn hitch indicating an alternate position.

DESCRIPTION OF PREFERRED EMBODIMENTS

Figure 1:
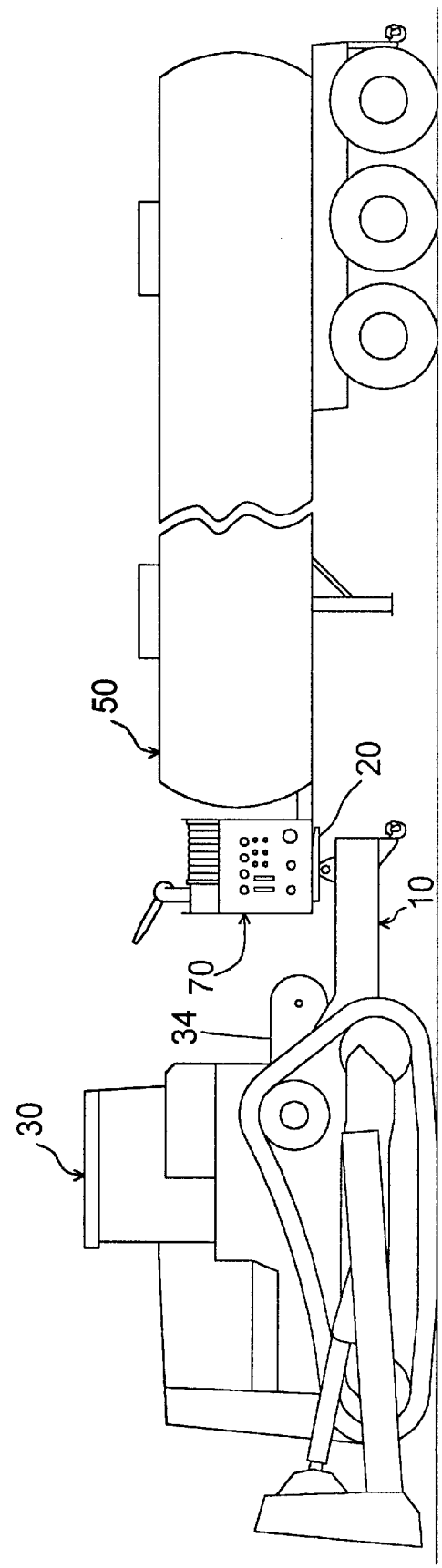
FIG. 1 is an elevation view of a continuous track vehicle, hitch assembly, and tank assembly of the present invention.

Referring to the drawings, the preferred embodiment of the present invention comprises a fire tractor 30, a hitch assembly 10, and a tank in the form of an over-the-road trailer 50 as shown in FIG. 1.

The preferred form of the fire tractor 30 is the continuous track vehicle, especially in the bulldozer configuration in the fifty ton gross weight class. This size bulldozer is especially desirable because it is the largest bulldozer readily transported over-the-road on a lowboy semi trailer. Such units are common in service to mining, construction, and forestry industries. Bulldozers configured for wild land fire break line construction and logging operations are usually equipped with a winch 34. Hitch assembly 10, removably connected, bolts to the rear of the bulldozer fire tractor 30 as shown in FIG. 3.

The hitch assembly 10 is constructed to use a fifth wheel plate 20 for quick locking coupling the tank in the configuration of an over-the-road semi trailer 50 to the bulldozer fire tractor 30. The rigid cantilever member 12 is preferably a tensile steel weldment to allow flexing in the member. The preferred fifth wheel plate attaching means 22 is a cradle design that provides side to side oscillation to further relieve torque and twist in the tank 51 when passing over rough terrain. An additional feature, the fairlead rollers 18 mounted to member 12 of hitch assembly 10 allow cable from the winch 34 to pass through the inside of member 12 so that the cable 36 may be brought taut against a load without fear of abrasion or binding against the rough exterior edges of the hitch assembly 10 as shown in FIG. 3.

Figure 5A:
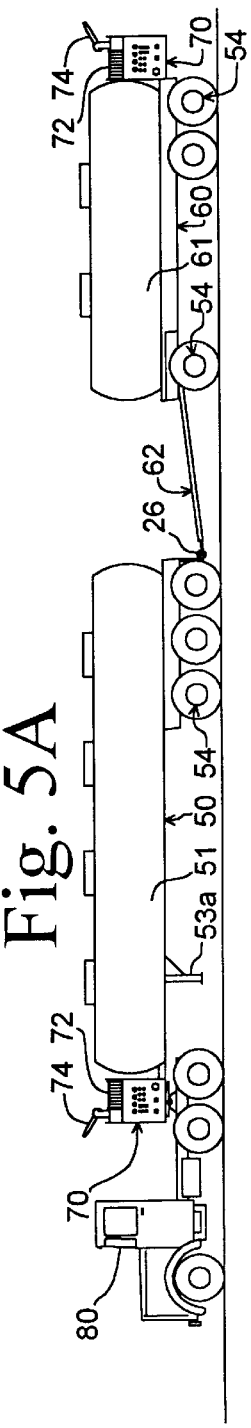
FIGS. 5A to 5D are an elevation view of the delivery and connection sequence for the transition between over-the-road and off-road use.
Figure 5B:
Figure 5C:
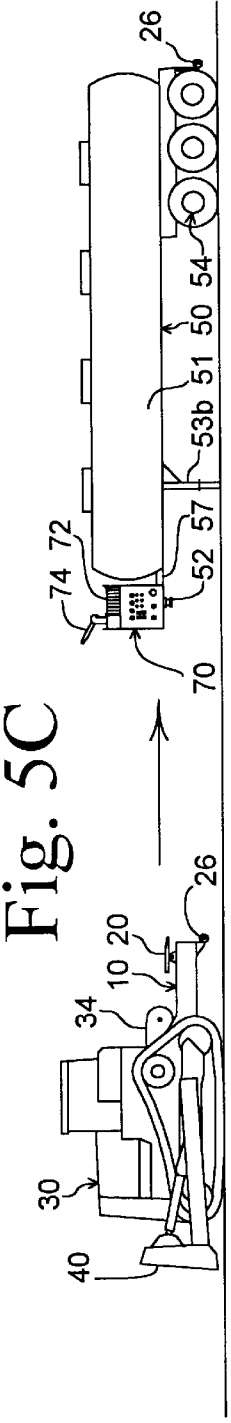
Figure 5D:
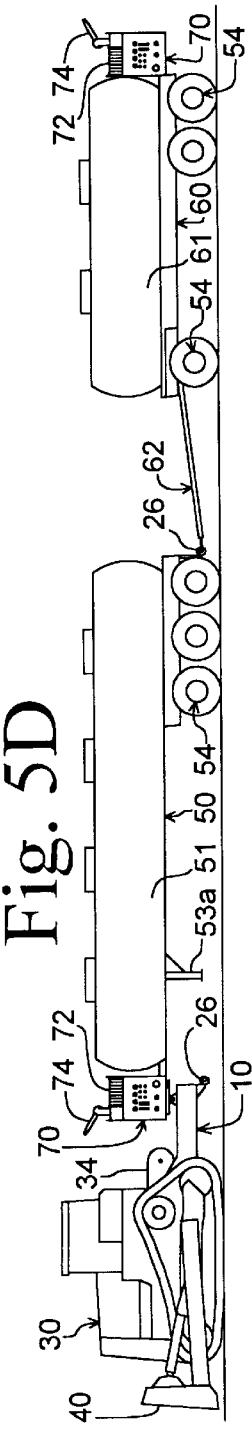

FIGS. 5A to D show the delivery sequence of the present invention. In FIG. 5A an over-the-road truck 80 arrives near a fire location with tanks in the configuration of an over-the-road semi trailer 50 and A-train trailer 60. Typical capacity for the semi tank 50 is 9000 gallons and for the A-train tank 60 is 5000 gallons. In FIG. 5B landing leg 53b has been lowered to the ground, to support and elevate semi tank 50 to allow unlocking and uncoupling of fifth wheel plate 20 of truck 80 and releasing the kingpin 52 of semi tank 50 so that truck 80 may drive away as indicated by the arrow. Further the A-train tank 60 drawbar 62 may be disconnected from the pintle hitch 26. In FIG. 5C the bulldozer fire tractor 30, with hitch assembly 10 previously installed, backs up as indicated by the arrow to engage the fifth wheel plate 20 of the hitch assembly 10 and the kingpin 52 on the semi tank 50. The kingpin 52 is guided into the center U shaped channel of the fifth wheel plate 20 where kingpin 52 is captured by the fifth wheel plate locking means completing the mating coupling of fifth wheel plate 20 and king pin 52. FIG. 5D shows the coupled assembly of bulldozer fire tractor 30 and semi tank 50 with landing leg 53b raised to the position of 53a, and ready to commence off road fire break line spraying operation.

Figure 6:
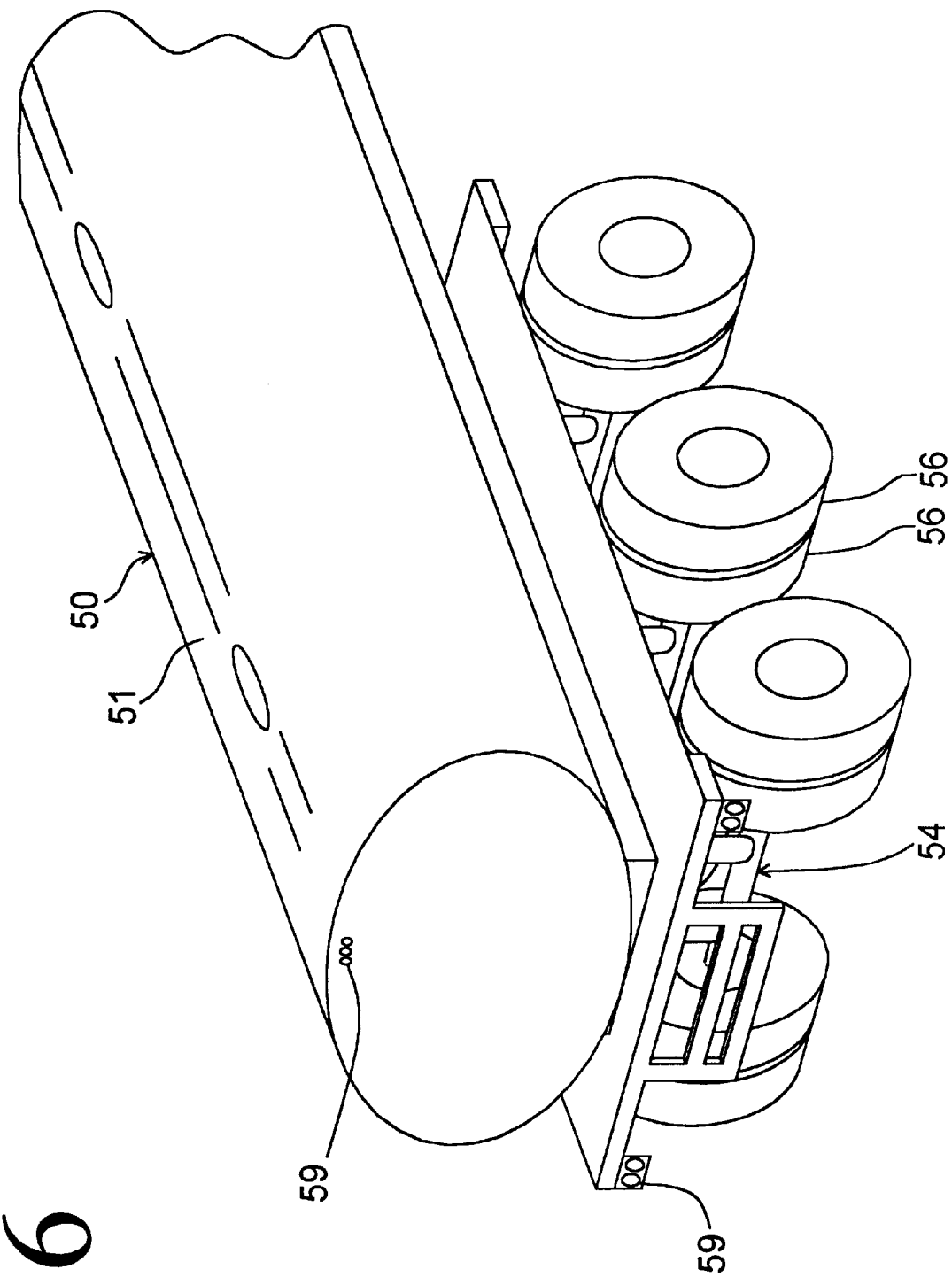
FIG. 6 is a perspective view of the rear of the semi tank assembly of the present invention.
Figure 10:
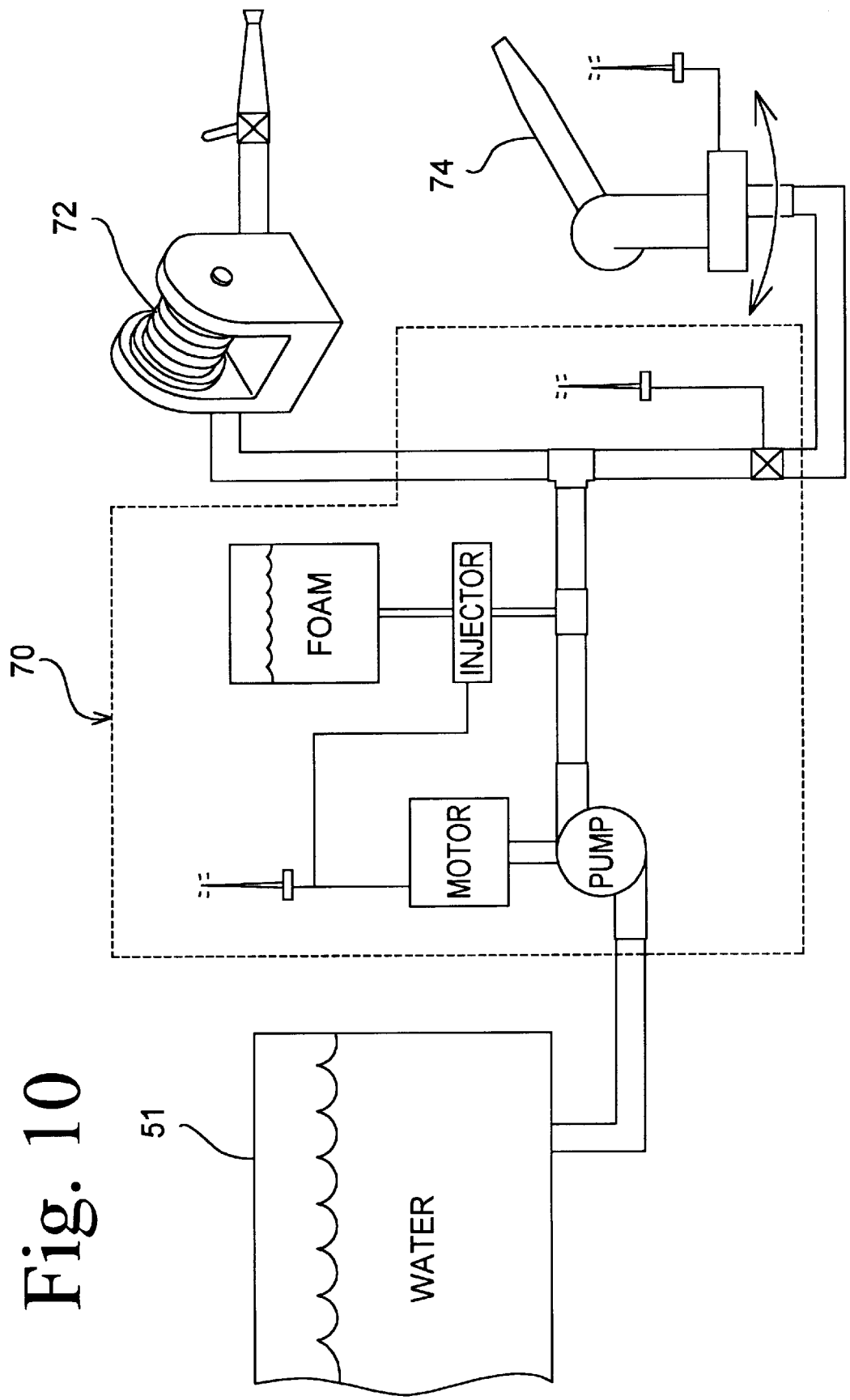
FIG. 10 is a schematic of the fluid delivery system.

The semi tank 50 in the preferred embodiment of the tank assembly and includes a four compartment tank 51 full of water and has mounted on the frame 57 a self powered pump assembly 70 a water canon or monitor discharge nozzle 74 and a hand held hose on a reel 72 for spraying a small spot fire. The pump assembly 70 carries thirty gallons of foam concentrate and a simple injection system. A pump assembly 70 is readily known to prior art and is shown in FIG. 10. The semi tank 50 is in the configuration of an over-the-road trailer with lights 59, axle assemblies complete with brakes and suspension 54, and tires 56 as indicated in FIG. 6. The semi tank 50 is also efficient off-road because of the multiple ply tires 56 and suspended axles 54 that further reduce torsional loading of the tank 51 when traveling over rough terrain.

The bulldozer 30 tows the semi tank 50 off road to the fire break line location steering the articulating assembly around obstacles and dropping the blade 40 just above the ground surface to raze small trees in the path of travel as necessary and desirable. The operator of the bulldozer preferably uses a remote control to start the pump 70 and aim the water canon discharge nozzle 74 perpendicular to the direction of travel of the tractor 30 and tank trailer 50. Discharge begins and the water from the tank 51 and foam concentrate are mixed and sprayed out as fire retardant or suppressant fluid in a stream 76, as represented in FIG. 2A. The discharge flow rate is one hundred twenty five gallon per minute and shoots a stream of foam fluid one hundred fifty feet away from the tank 50. The bulldozer fire tractor 30 travels at a rate of ten miles per hour, it sprays a fire break line of foam one hundred fifty feet wide and ten miles long in an hour without having to stop for more water, foam concentrate, or fuel. After discharge, the foam continues expanding on the fuel mass. Fire fighting fluid concentrate is readily available as a high expansion aqueous film forming foam. Biodegradable aqueous film forming foam is the highly desirable preferred fluid for the method. The fire retardant or suppressant fluid exhibits one or more of the characteristics of extinguishing or suppressing fire by blanketing the fuel surface, smothering the fire or separating the flame from the fuel, also cooling the fuel or suppressing the release of flammable vapors rendering the fuel mass inflammable.

Secondary preferred embodiments are to use the A-train tank in the configuration of an over-the-road trailer 60 in the same manner as the semi tank 50 to fight fire and create, maintain, and renew fire break lines. The A-train tank 60 has a two compartment tank 61 and provides the same fire break line albeit 5 miles long. The A-train tank 60 like the semi-tank 50 has the configuration of an over-the-road trailer with lights 59, axles complete with brakes and suspension 54, and tires 56. The A-train tank assembly 60 has forward and rearward axles 54 or a plurality of axles 54 at the forward or rearward ends. An elevation view of the A-train tank assembly is shown in FIG. 5D in a train configuration with the bulldozer fire tractor 30, semi tank assembly 50, and A-train tank assembly 60. This mode is highly advantageous for creating fire break lines especially over flat terrain. FIG. 5D shows pump 70 mounted on the rear of the A-train tank and the front of the semi-tank 60, the location of the pump 70 about the fore or aft, top or bottom of the tank provide acceptable mounting locations, or even mounted on the fire tractor 30 especially to take advantage of a power take off unit. FIG. 2B shows an plan view of bulldozer fire tractor 30 coupled to the A-train tank 60. The drawbar assembly 62 in this case is connected with the pintle hitch 26. The pintle hitch 26 of FIG. 8 is the preferred connection hitch for attaching drawbar eye 63, as shown in FIG. 4, of drawbar assembly 62 to hitch assembly 10 or the rear of semi tank 50. It is a secondary embodiment to use a pivoting towing-horn hitch 28, as shown in FIG. 9A which is a modified form of the pintle hitch 26, as the connection hitch for attaching to drawbar eye 63. Pivoting towing-horn hitch 28 while being more expensive and complicated by the pivoting and load bearing horn 29, has the advantage of quicker coupling than pintle hitch 26. Pintle hitch 26 and pivoting towing-horn hitch 28 are represented in FIGS. 8, 9A, and 9B with the open positions ready to receive drawbar eye 63 and alternate closed and locked positions. FIG. 4 shows a perspective view of the pintle hitch 26 of hitch assembly 10 closed, locked, and connected to drawbar eye 63 of drawbar assembly 62 of A-train tank 60. While the combination fire tractor 30 and A-train tank assembly 60 maximizes the use of a bulldozer fire tractor with hitch assembly 10, the fire tractor for this embodiment, represented in FIG. 2B, is highly efficient as a wheeled tractor. Tractors suitable for the secondary preferred embodiments to connect hitch assembly 10 include wheeled tractors, bulldozers, excavators, log skidders, snow groomers, and military armored tanks but are not limited to these type.

Although the most efficient use of the present invention is fire fighting foam application it is also useful to provide tank water for replenishing tender trucks and smaller tender trailers and to use tank water for conventional water fire fighting methods.

The hitch assembly 10 is constructed for attachment of frame member 12 to the rear of the fire tractor continuous track vehicle 30 by bolting frame member 12 using bolts 15 and holes 14, to the rear of continuous track vehicle 30 as represented in FIGS. 3 and 7, or by pinning to the rear of continuous track vehicle 30 using lock pins 17 and holes 16 depending on the particular continuous track vehicle which hitch assembly 10 is being removably attached to. FIG. 7 shows two of the lock pins 17 and hitch assembly 10 in an exploded view. Cantilever member 12 supporting fifth wheel plate 20 and attaching means mount base 22 may also be attached by welding to the rearward end of the continuous track vehicle. The construction of frame member 12 will be easily accomplished with profile burned steel plate welded together, casting, or other methods by one skilled in the art.

The foregoing description of the preferred embodiments of the invention has been presented for the purpose of illustration and description. It is not intended to be exhaustive or to limit the invention. Many modifications and variations are possible in light of the above description. It is intended that the scope of the invention not be limited by this detailed description, but rather by the claims appended hereto.

What is claimed is:

1. A method of fluid delivery comprising the steps of:
   a) receiving and carrying fire retardant or suppressant fluid in a tank which is in the configuration of an over the road semitrailer tank assembly and is connected to a continuous track vehicle for drawing said semitrailer tank assembly off road by a fifth wheel which said connection transmits all of the draft;

b) maneuvering said vehicle and said semitrailer tank assembly off road to a remote location for strategic placement of said fluid;

c) and discharging and delivering said fluid to a combustible fuel while engaged in the act of drawing said continuous track vehicle and said semitrailer tank assembly for the purpose of fighting a fire.

2. The method in claim 1, wherein the discharging of said fluid is for fighting said fire by creating a fire break line.

3. The method in claim 1, wherein the discharging of said fluid is for fighting said fire by maintaining a fire break line.

4. The method in claim 1, wherein the discharging of said fluid is for fighting said fire by delivering said fluid to tender trucks at said remote locations.

5. The method in claim 1, wherein said semitrailer tank assembly is first trucked over the road to said remote location and then delivered for coupling to said continuous track vehicle wherein said continues track vehicle proceeds off road to said remote location for fighting said fire.

6. The method in claim 1, wherein said continuous track vehicle is first trucked over the road and then delivered near a strategic off road location for coupling to said semitrailer tank assembly, drawing toward said remote location and fighting said fire.

7. The method in claim 1, wherein a tank in the configuration of an over the road A-train trailer is coupled behind said semitrailer tank assembly and drawn off road for the purpose of fighting fire and supplementing the discharge capacity of said continuous track vehicle and said semi trailer tank assembly.

8. The method in claim 1 wherein said combustible fuel that may already be partially consumed by fire is extinguished or said consumption is retarded by applying said fluid.

9. A fire fighting apparatus comprising:

a) a continuous track vehicle, b) a tank in the configuration of an over the road semitrailer tank assembly which is coupled to said continuous track vehicle wherein said coupling means is comprised of a fifth wheel plate and a kingpin, c) fire retardant or suppressant fluid contained in said semitrailer tank assembly, d) and means for discharging said fluid by spraying.

10. The apparatus in claim 9, wherein means for discharging includes a pump mounted about said semitrailer tank assembly to pump said fluid for said discharge.

11. The apparatus in claim 9, wherein said discharge of said fluid is for creating a fire break line.

12. The apparatus in claim 9, wherein said discharge of said fluid is for maintaining a fire break line.

13. The apparatus in claim 9, wherein said discharge of said fluid is by gravity fluid head flow for providing said fluid to tender trucks at remote off road locations.

* * * * *